United States Patent
Marques et al.

(10) Patent No.: US 11,120,658 B1
(45) Date of Patent: Sep. 14, 2021

(54) SECURE AND SAFE ACCESS CONTROL

(71) Applicant: Rockwell Automation Technologies, Inc., Mayfield Heights, OH (US)

(72) Inventors: Roberto Marques, Milwaukee, WI (US); James K. Newbern, Milwaukee, WI (US); Calvin C. Steinweg, Milwaukee, WI (US); Robert Dilgard, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/901,312

(22) Filed: Jun. 15, 2020

(51) Int. Cl.
| | |
|---|---|
| *G07C 9/29* | (2020.01) |
| *G06F 21/31* | (2013.01) |
| *E05B 67/38* | (2006.01) |
| *G06K 7/10* | (2006.01) |
| *E05B 47/00* | (2006.01) |
| *H04L 29/06* | (2006.01) |

(52) U.S. Cl.
CPC ............ *G07C 9/29* (2020.01); *E05B 47/0001* (2013.01); *E05B 67/383* (2013.01); *G06F 21/31* (2013.01); *G06K 7/10366* (2013.01); *H04L 63/04* (2013.01)

(58) Field of Classification Search
CPC ..... G07C 9/29; E05B 47/0001; E05B 67/383; G06F 21/31; G06K 7/10366; H04L 63/04
USPC ........................................................ 340/5.6
See application file for complete search history.

(56) References Cited

U.S. PATENT DOCUMENTS

| | | | |
|---|---|---|---|
| 7,880,585 B1* | 2/2011 | Aronson | E05B 45/005 340/5.73 |
| 2010/0045464 A1* | 2/2010 | Knopf | E04G 21/32 340/573.1 |
| 2015/0221459 A1* | 8/2015 | Oneufer | H01H 9/161 200/50.26 |
| 2016/0371908 A1* | 12/2016 | Dow | F16P 1/02 |
| 2017/0003662 A1* | 1/2017 | Lane | G05B 9/02 |
| 2017/0256111 A1* | 9/2017 | Chung | G07C 9/00309 |
| 2020/0090440 A1* | 3/2020 | Puig | F16P 3/00 |
| 2021/0074092 A1* | 3/2021 | Davis | G07C 9/28 |

OTHER PUBLICATIONS

Wireaway General Standard Class 5100, Mar. 1993 (Year: 1993).*

* cited by examiner

*Primary Examiner* — Emily C Terrell
(74) *Attorney, Agent, or Firm* — Kunzler Bean & Adamson; Scott D. Thorpe

(57) ABSTRACT

For secure and safe access control, a method authenticates the user of an equipment unit with a user credential. The method determines whether the user is authorized to access the equipment unit with an equipment authorization. In response to the user being authenticated and authorized to access the equipment unit, the method releases a unit lock for the equipment unit with a unit lock credential or the user credential.

17 Claims, 17 Drawing Sheets

303

| User Credential 351 |
| --- |
| Equipment Authorizations 353 |

| Unit Identifier 337 | User Authorization 355 | Unit Lock Credential 333 |
| --- | --- | --- |
| Unit Identifier 337 | User Authorization 355 | Unit Lock Credential 333 |
| ⋮ | | |
| Unit Identifier 337 | User Authorization 355 | Unit Lock Credential 333 |

FIG. 3D

SECURE AND SAFE ACCESS CONTROL

BACKGROUND INFORMATION

The subject matter disclosed herein relates to secure and safe access control for equipment units.

BRIEF DESCRIPTION

A method for secure and safe access control is disclosed. The method authenticates the user of an equipment unit with a user credential. The method determines whether the user is authorized to access the equipment unit with an equipment authorization. In response to the user being authenticated and authorized to access the equipment unit, the method releases a unit lock for the equipment unit with a unit lock credential or the user credential.

An apparatus for secure and safe access control is also disclosed. A processor authenticates the user of an equipment unit with a user credential. The processor determines whether the user is authorized to access the equipment unit with an equipment authorization. In response to the user being authenticated and authorized to access the equipment unit, the processor releases a unit lock for the equipment unit with a unit lock credential or the user credential.

A computer program product for secure and safe access control is also disclosed. A processor authenticates the user of an equipment unit with a user credential. The processor determines whether the user is authorized to access the equipment unit with an equipment authorization. In response to the user being authenticated and authorized to access the equipment unit, the processor releases a unit lock for the equipment unit with a unit lock credential or the user credential.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3C is a schematic block diagram of a user record according to embodiment;

FIG. 3D is a schematic block diagram of equipment authorizations according to an embodiment;

DETAILED DESCRIPTION

Figure 1A:
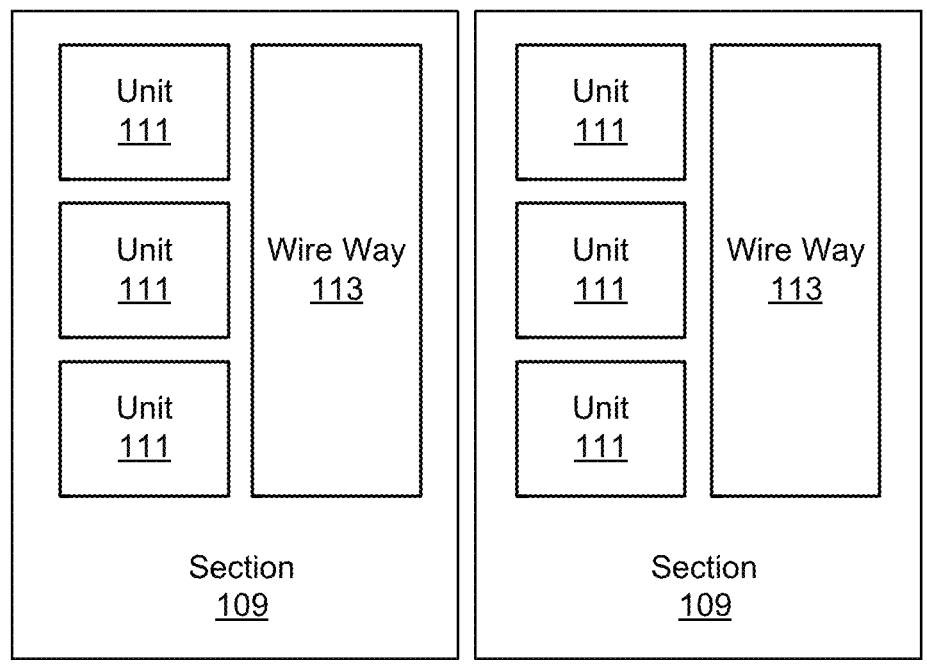
FIG. 1A is a schematic block diagram of an access control system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of an access control system 100. The system 100 includes at least one section 109. Each section 109 includes at least one equipment unit 111. An equipment unit 111 may control and/or provide power to automation and/or electrical equipment such as a motor controller starter, a variable frequency drive, an electrical motor, a transformer, lights, etc. In one embodiment, the equipment unit 111 is a Motor Control Center (MCC) unit. A section 109 may also include a wire way 113. The wire way 113 may route and provide access to wiring from the equipment units 111.

Because the equipment units 111 may manage high electrical currents and/or control automation equipment, it is vital that access to the equipment units 111 be restricted to only qualified, authorized users especially if equipment units 111 are energized and, therefore, exposing the user to electrical shock and/or arc flash risk. Unfortunately, the number of potential users in a factory setting is often very large, complicating the management of access to the equipment units 111. The embodiments described herein authenticate the user of an equipment unit 111 with a user credential and determine whether the user is authorized to access the equipment unit 111 with an equipment authorization. Only if the user is authenticated and authorized to access the equipment unit 111 will the embodiments provide access to the equipment unit 111 as will be described hereafter. As a result, access to the equipment units 111 is efficiently and safely managed. The embodiments do not interfere with electrical safety procedures for equipment units 111 such as Lock-Out/Tag-Out.

Figure 1B:
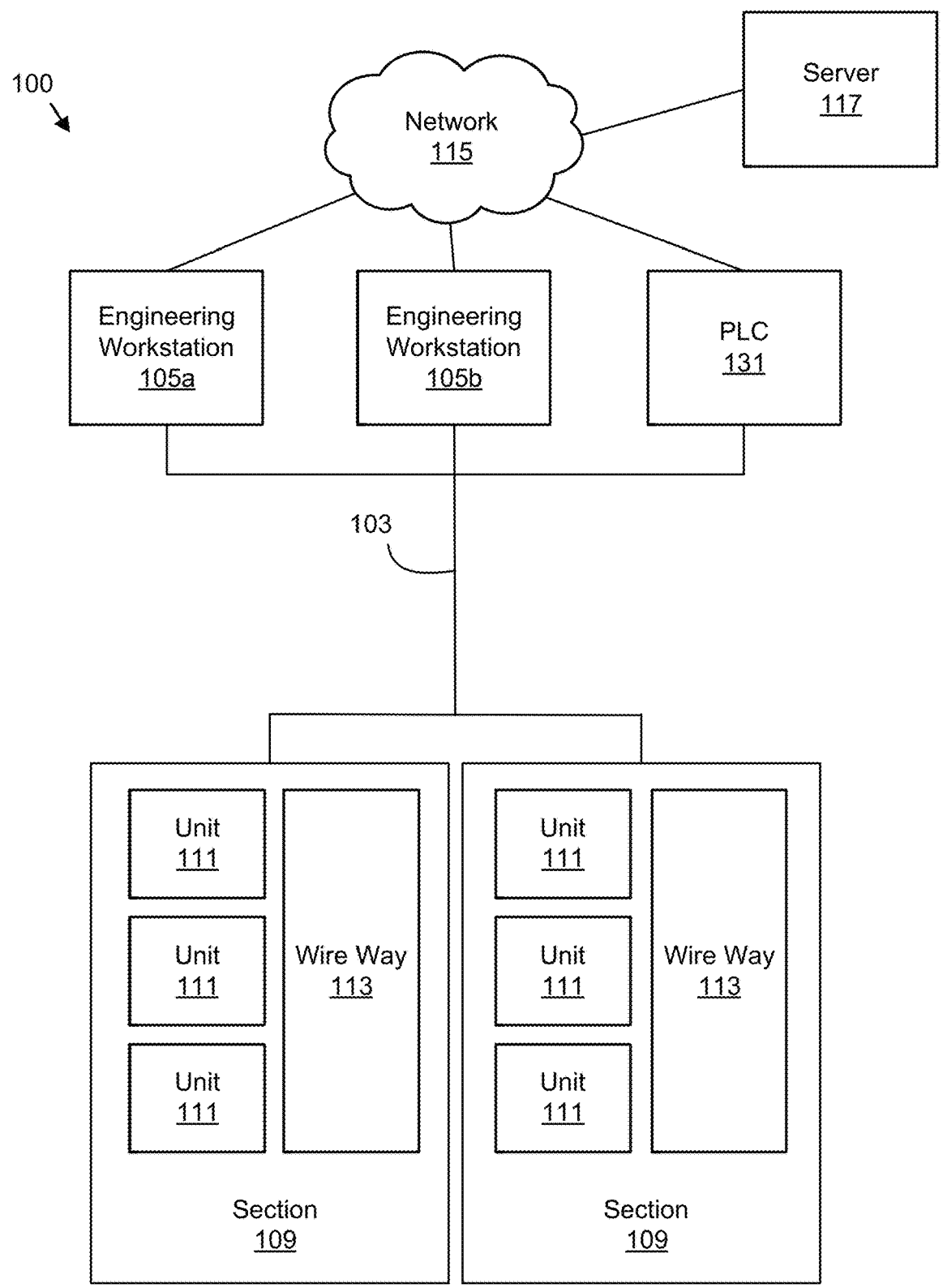
FIG. 1B is a schematic block diagram of an access control system according to an alternate embodiment.

FIG. 1B is a schematic block diagram of an access control system 100. The sections 109 of FIG. 1A are shown. In addition, the system 100 includes at least one engineering workstation 105, a programmable logic controller (PLC) 131, a server 117, and/or a network 115. The network 115 may be a local area network, a wide area network, the Internet, a Wi-Fi network, or combinations thereof.

The engineering workstations 105 and/or PLC 131 may communicate with the sections 109 via a secure conduit 103. The secure conduit 103 may provide Ethernet/IP CIP security. In one embodiment, the secure conduit 103 protects against unauthorized electronic access to the automation devices located in the sections 109. In a certain embodiment, the secure conduit 103 provides protection against unintentional access to the automation devices located in the sections 109.

The engineering workstations 105, PLC 131, and/or server 117 may manage the equipment units 111. The server 117 may be a FACTORYTALK® server 117. In addition, the engineering workstations 105, the PLC 131, and/or the server 117 may manage access to the equipment units 111 of the sections 109. In one embodiment, the engineering workstations 105, the PLC 131, and/or the server 117 may release a unit lock for an equipment unit 111 with the unit lock credential and/or a user credential as will be described hereafter.

Figure 1C:
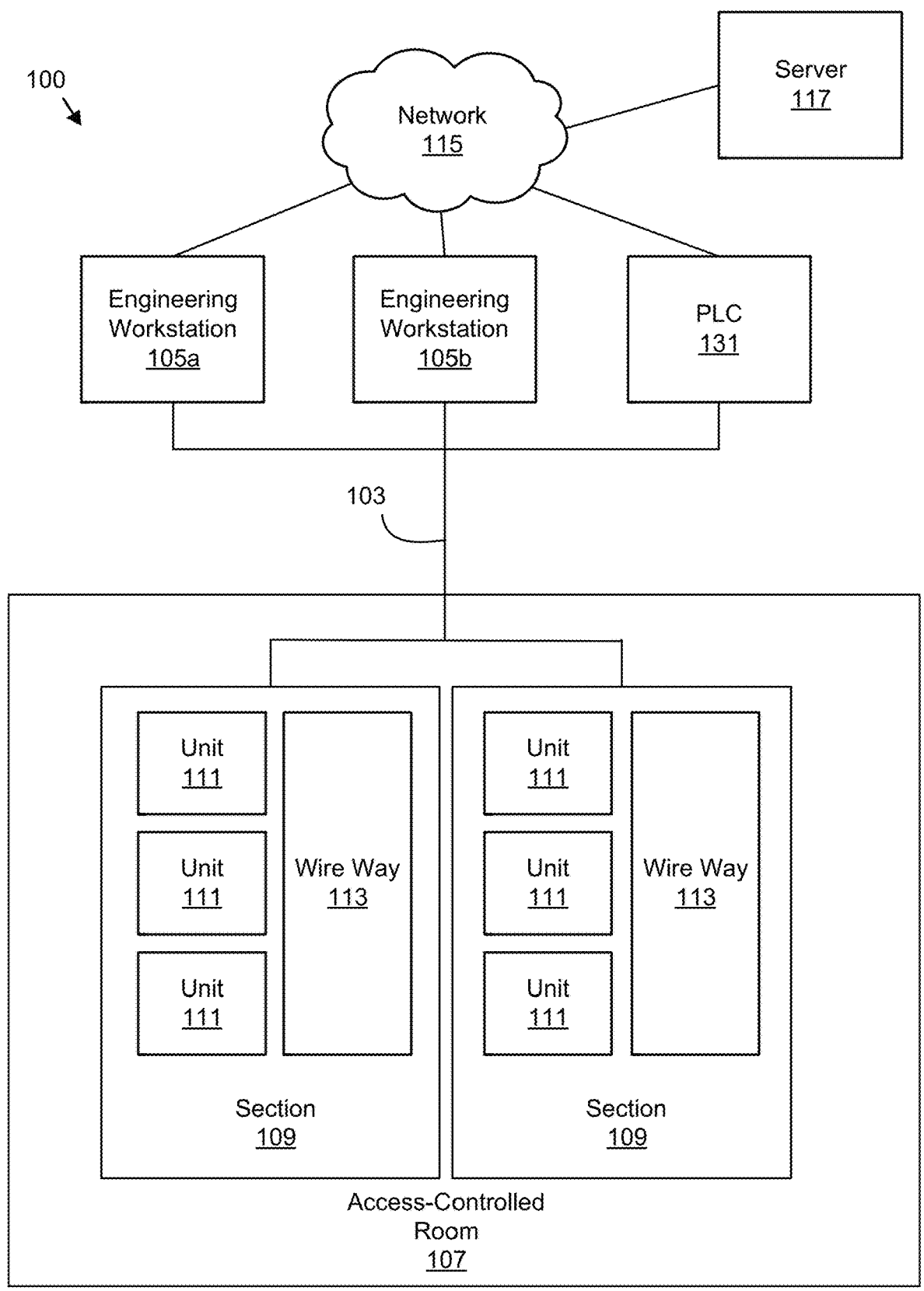
FIG. 1C is a schematic block diagram of an access control system according to an alternate embodiment.

FIG. 1C is a schematic block diagram of an access control system 100. The system 100 of FIG. 1B is shown with the sections 109 disposed in an access-controlled room 107. For example, the access-controlled room 107 may only be accessed via locked doors. The locked doors may be opened with the unit lock credential and/or the user credential.

Figure 1D:
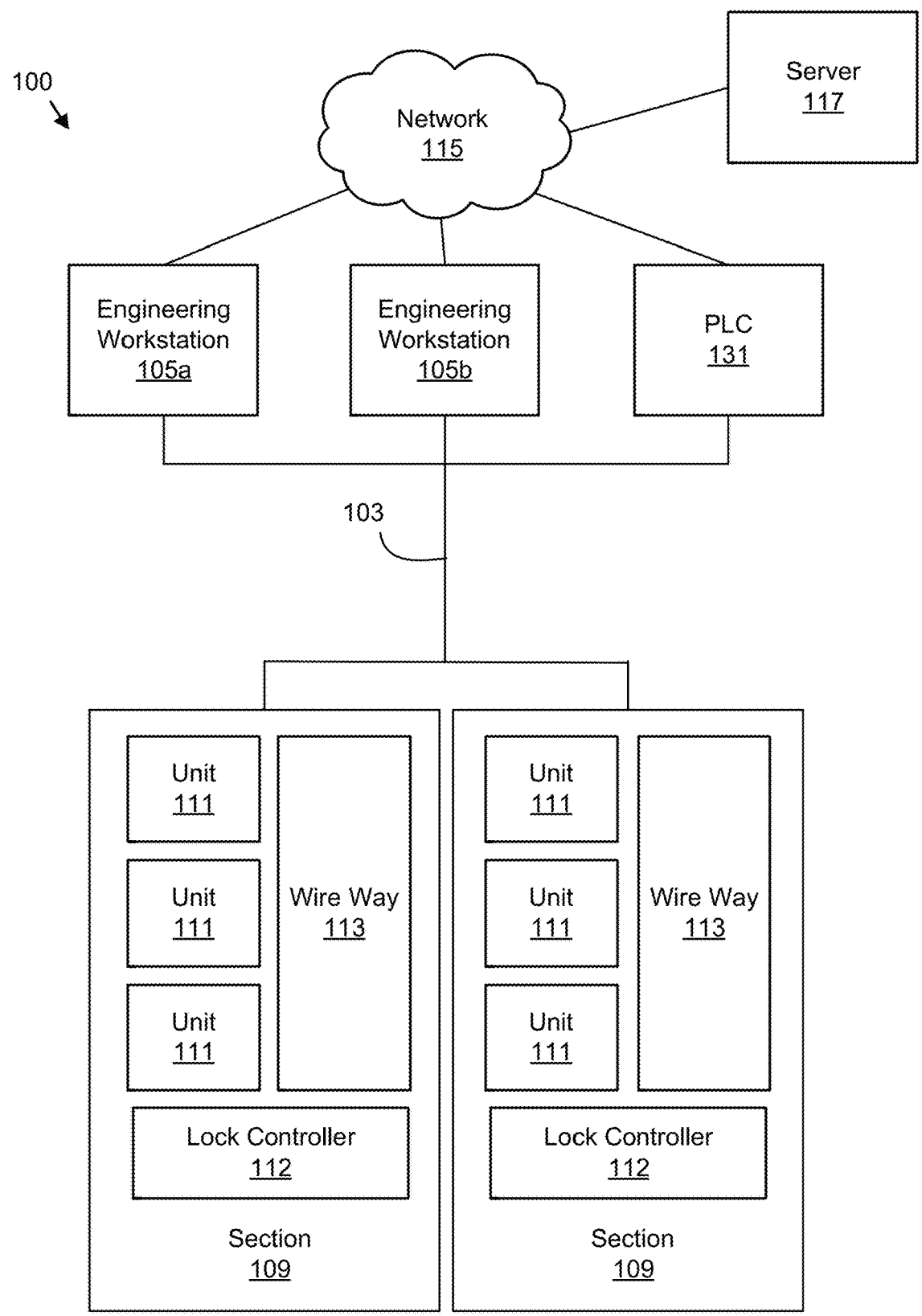
FIG. 1D is a schematic block diagram of an access control system according to an alternate embodiment.

FIG. 1D is a schematic block diagram of an access control system 100. The system 100 of FIG. 1B is shown with lock controllers in each section 109. The lock controllers 112 may control and/or manage unit locks. For example, the lock controllers 112 may release and/or set the unit locks as will be described hereafter.

Figure 2A:
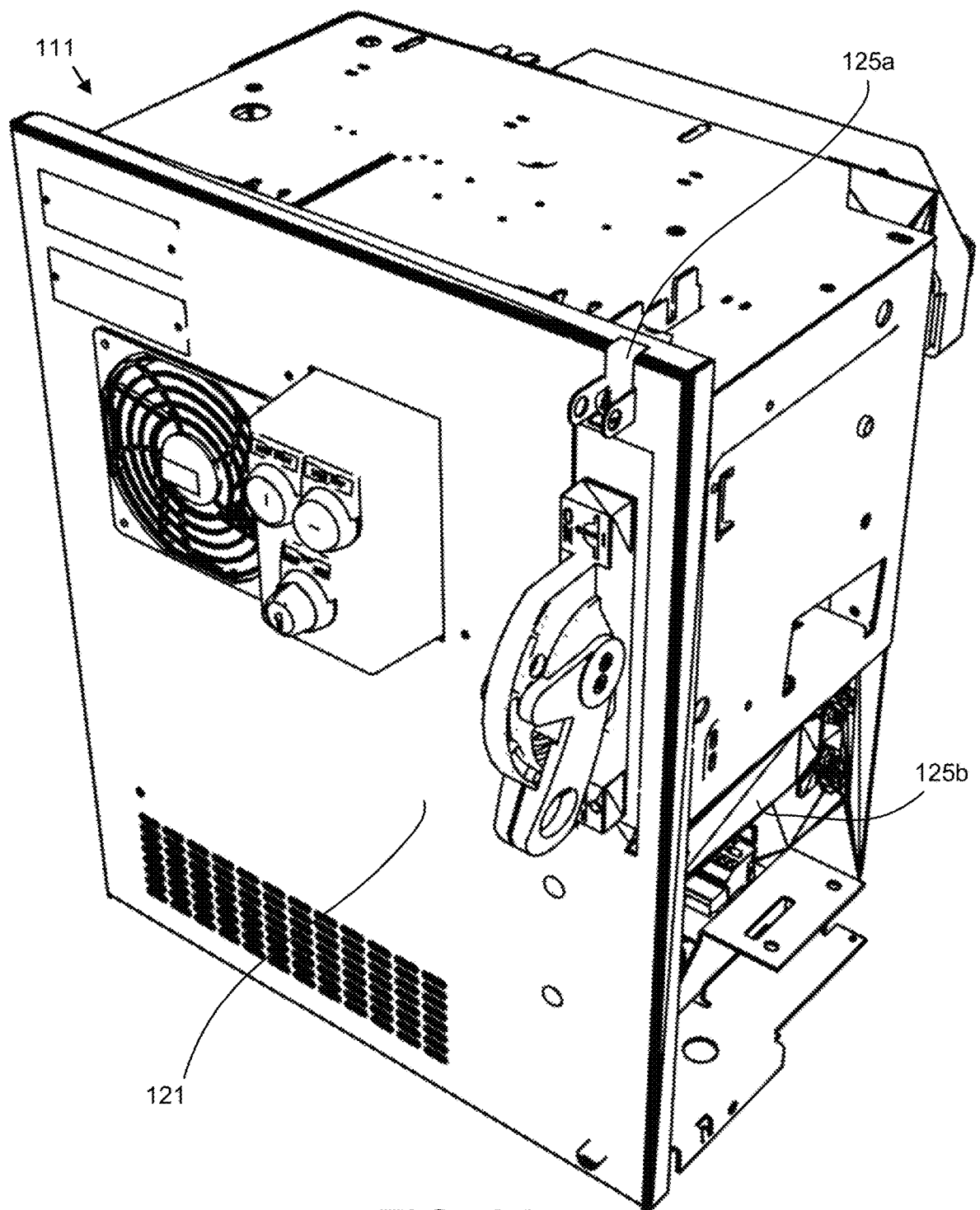
FIG. 2A is a perspective drawing of an equipment unit according to an embodiment.

FIG. 2A is a perspective drawing of an equipment unit 111. In the depicted embodiment, the equipment unit 111 includes two unit locks 125. The unit locks 125 may prevent an equipment unit door 121 of the equipment unit 111 from being opened. A manual unit lock 125a is shown that employs a padlock to us secure the equipment unit door 121. The manual unit lock 125a is further described in FIG. 2E.

A safety lock unit lock 125b is also shown. The safety lock unit lock 125b may prevent the equipment unit door 121 from being opened unless the safety lock unit lock 125b receives a command and/or credential such as from the engineering workstations 105, the PLC 131, and/or the server 117 via the secure conduit 103. The safety lock unit lock 125b may receive a command and/or credential from a local lock controller installed in each equipment unit 111 and/or in a section 109.

Figure 2B:
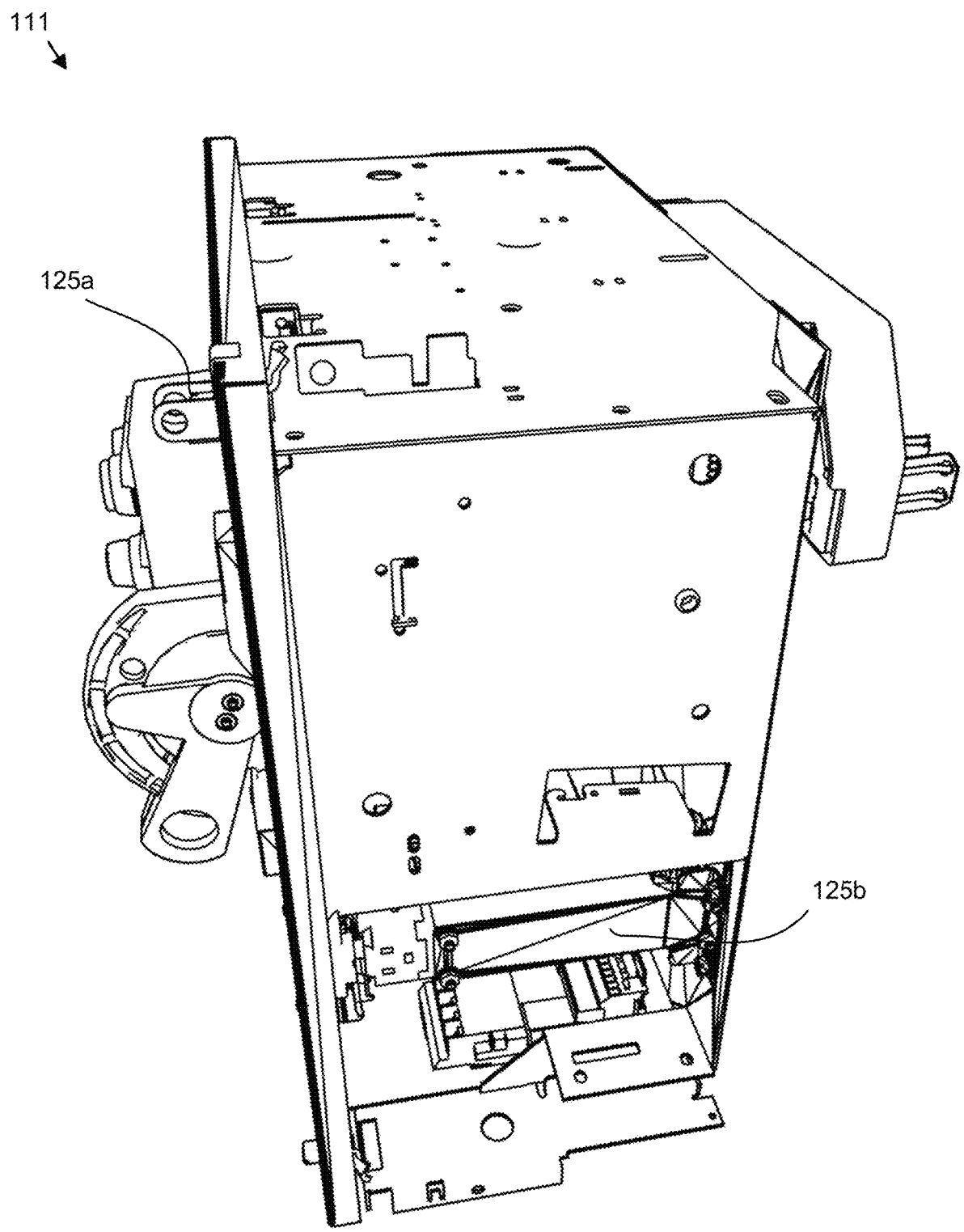
FIG. 2B is a perspective drawing of an equipment unit according to an embodiment.

FIG. 2B is a perspective drawing of an equipment unit 111. The manual unit lock 125a and the safety lock unit lock 125b are shown.

Figure 2C:
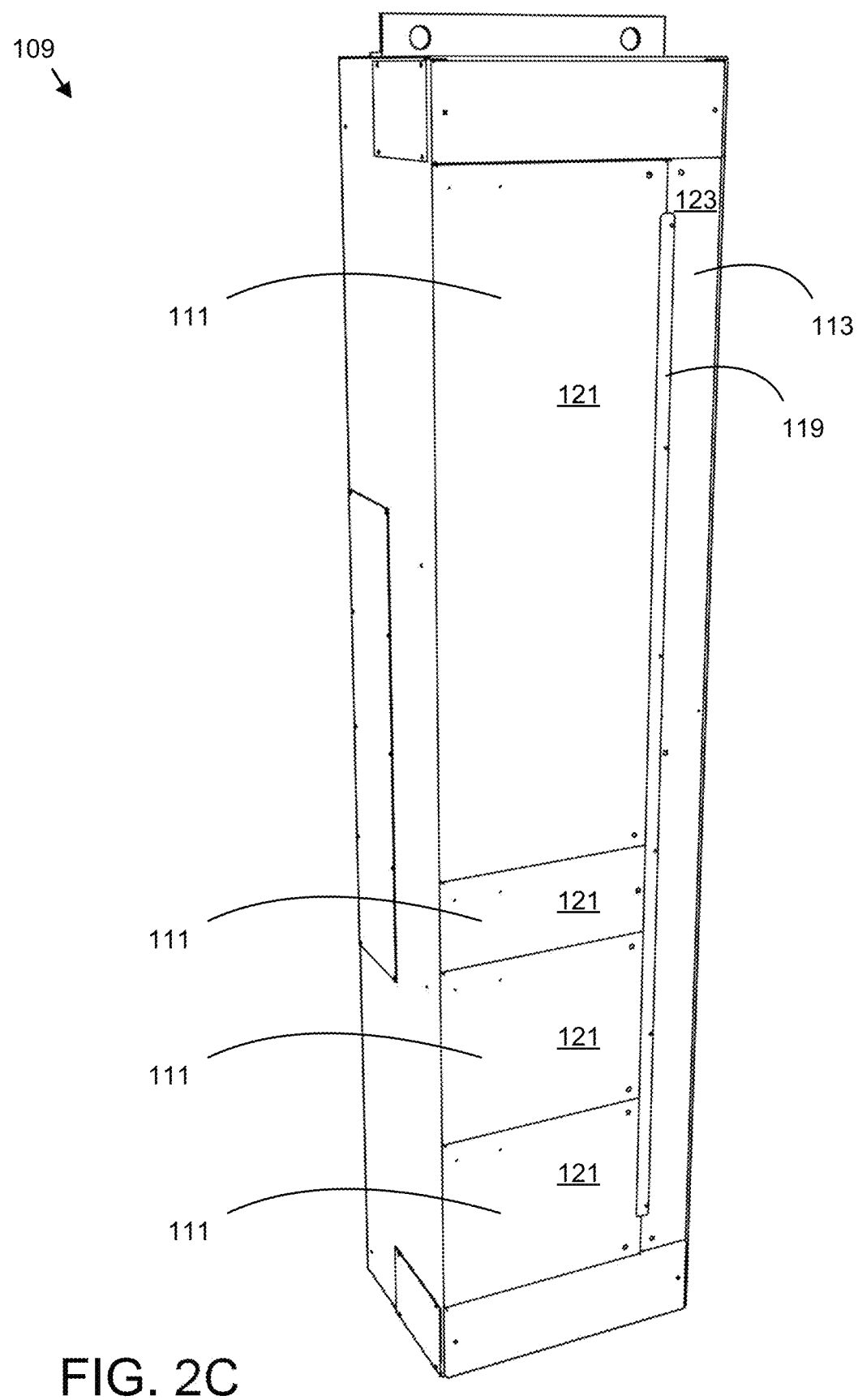
FIG. 2C is a perspective drawing of a section according to an embodiment.

FIG. 2C is a perspective drawing of a section 109. A plurality of equipment units 111 are disposed in the section 109. In the depicted embodiment, the equipment units 111 are adjacent to the wire way 113. The wire way 113 routes wires for the equipment units 111. In addition, the wire way 113 provides access to the wires. The wire way 113 includes a wire way door 123 that provides access to the wires.

An expansion plate 119 is secured to the section 109 and blocks the equipment unit door 121 from opening. The expansion plate 119 may only be removed if the wire way door 123 is open. In one embodiment, a unit lock 125 such as the safety lock unit lock 125b secures the wire way door 123. As a result, the unit lock 125 of the wire way door 123 is used to secure a plurality of equipment unit doors 121. The unit lock 125 is released from the wire way door 113 to release the expansion plate 119 and release the equipment unit doors 121.

Figure 2D:
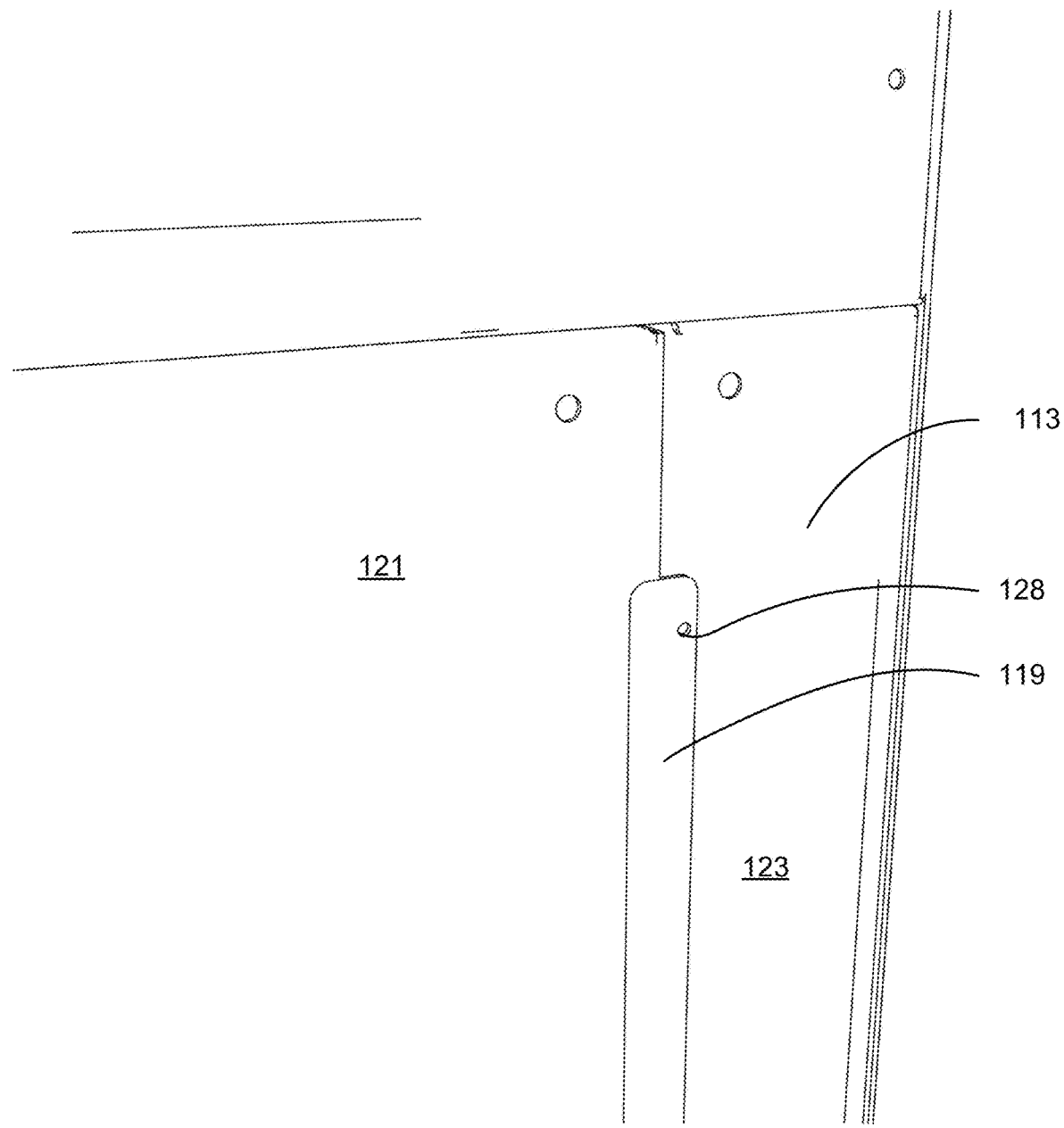
FIG. 2D is a perspective drawing of an equipment unit and wire way according to an embodiment.

FIG. 2D is a close-up perspective drawing of the equipment unit 111 and the wire way 113 of FIG. 2C. in the depicted embodiment, the expansion plate 119 is secured by a pin 128. The pin 128 may only be removed after opening the wire way door 123 in response to releasing the unit lock 125 on the wire way 113.

Figure 2E:
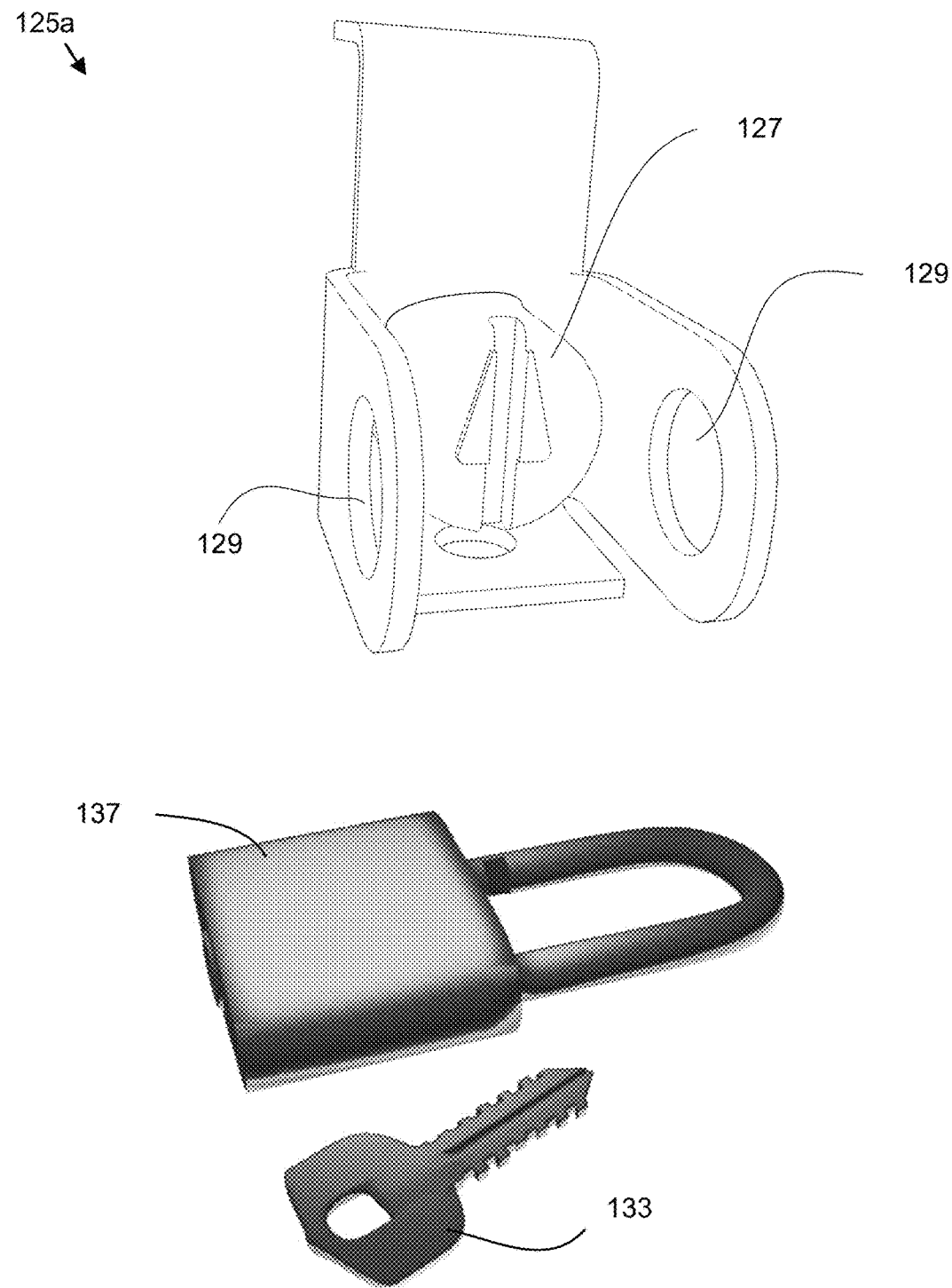
FIG. 2E is perspective drawings of a unit lock, padlock, and key according to an embodiment.

FIG. 2E is perspective drawings of the manual unit lock 125a, a padlock 137, and a key 133. The manual unit lock 125a includes a release pin 127. The release pin 127 secures an equipment unit door 121 or a wire way door 123. The release pin 127 must be turned and/or extended outward to release the manual unit lock 125a and open the equipment unit door 121 or the wire way door 123. However, if the padlock 137 is threaded through lock holes 129 on the manual unit lock 125a, the release pin 127 cannot be turned and/or extend outward. As a result, the padlock 137 prevents opening the equipment unit door 121 or the wire way door 123 and accessing the equipment unit 111 unless the padlock 137 is opened with the key 133 and removed from the lock holes 129.

Figure 2F:
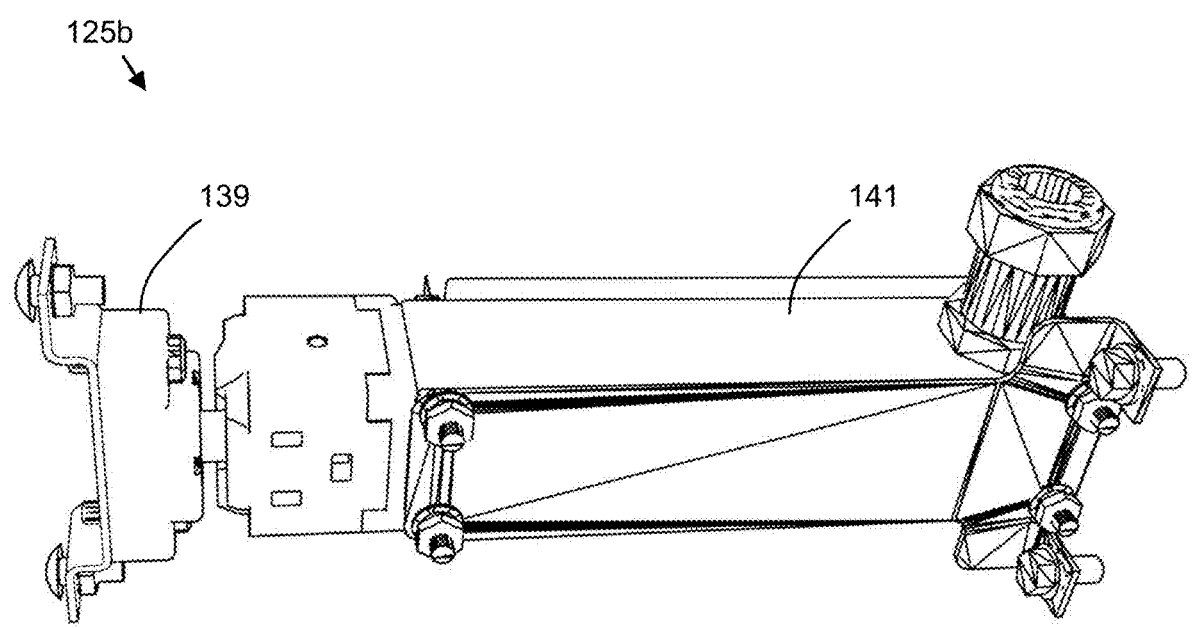
FIG. 2F is a perspective drawing of a unit lock according to an embodiment.

FIG. 2F is a perspective drawing of a safety lock unit lock 125b. The safety lock unit lock 125b includes an actuator 141 that secures a stop 139. The stop 139 is connected to an equipment unit door 121 or a wire way door 123. The stop 139 prevents the equipment unit door 121 or the wire way door 123 from opening. If the actuator 141 is activated in response to a command, the actuator 141 releases the stop 139 and allows the equipment unit door 121 to open.

Figure 2G:
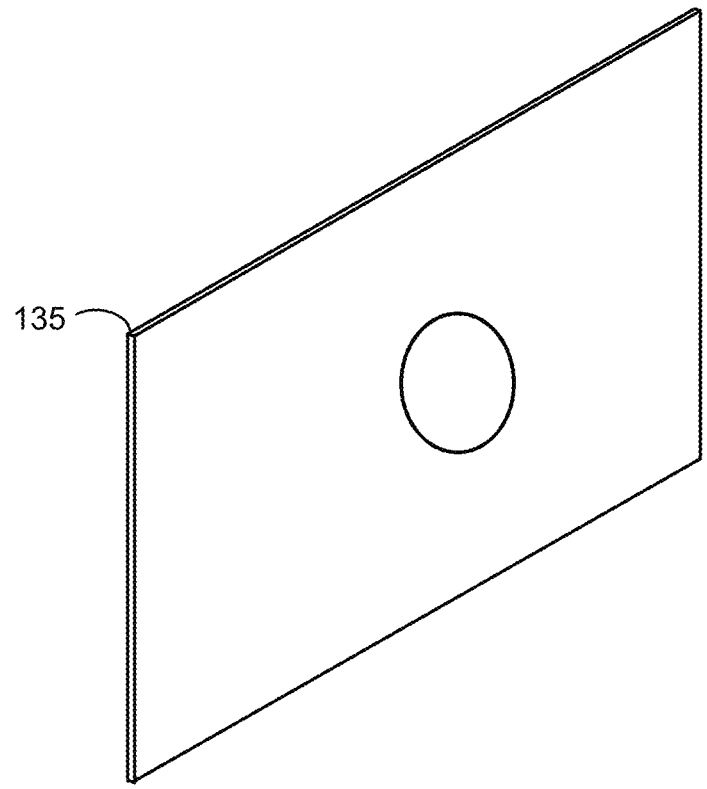
FIG. 2G is a perspective drawing of a Radio Frequency Identifier (RFID) according to an embodiment.

FIG. 2G is a perspective drawing of an RFID 135. The RFID 135 may store a user credential. The RFID 135 may communicate the user credential when interrogated by a tag reader. The RFID 135 may be used to authenticate a user as will be described hereafter.

Figure 2H:
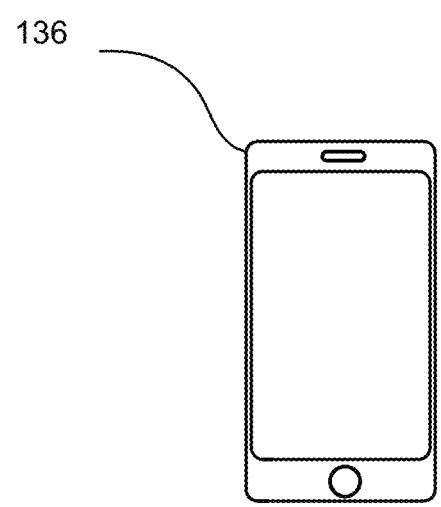
FIG. 2H is a drawing of an electronic device according to an embodiment.

FIG. 2H is a drawing of an electronic device 136. In the depicted embodiment, the electronic device 136 is a mobile telephone. The electronic device 136 may also be a tablet computer, a laptop computer, and the like. The electronic device 136 may communicate the user credential to a unit lock 125 and/or lock controller 112. In one embodiment, the electronic device 136 executes an application that communicates with the unit 125 and/or lock controller 112.

Figure 3A:
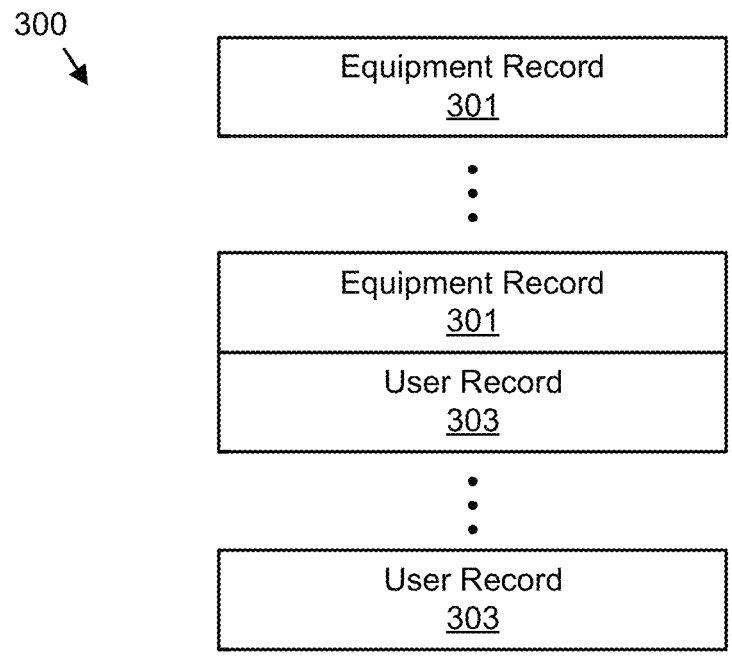
FIG. 3A is a schematic block diagram of access data according to an embodiment.

FIG. 3A is a schematic block diagram of access data 300. The access data 300 may be employed to authenticate the user of an equipment unit 111 and/or to determine whether the user is authorized to access the equipment unit 111. The access data 300 may be organized as a data structure in a memory. In the depicted embodiment, the access data 300 includes a plurality of equipment records 301 and a plurality of user records 303. In one embodiment, each equipment unit 111 and/or wire way 113 has an equipment record 301. In a certain embodiment, each type of equipment unit 111 has an equipment record 301. The equipment record 301 is described hereafter in FIG. 3B.

Each user may have a user record 303. In a certain embodiment, each category of user has a user record 303. The user record 303 is described hereafter in FIG. 3C.

Figure 3B:
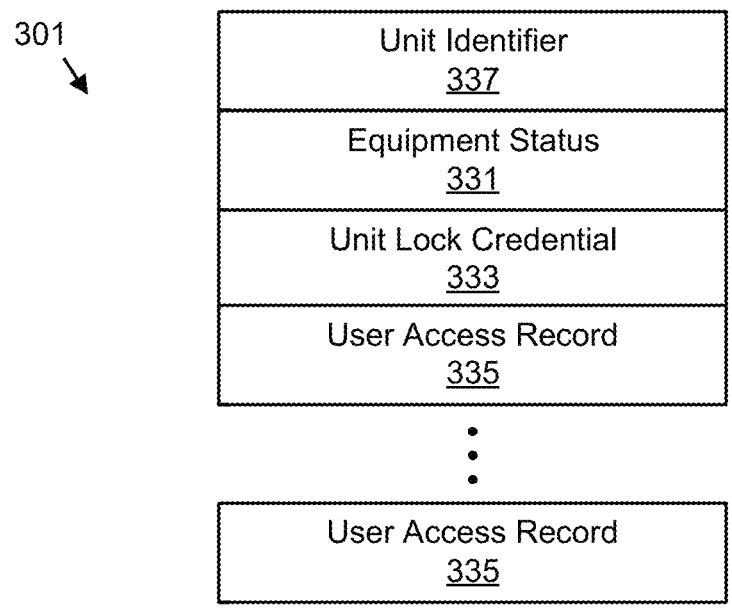
FIG. 3B is a schematic block diagram of an equipment record according to an embodiment.

FIG. 3B is a schematic block diagram of the equipment record 301. The equipment record 301 may be employed to manage access to an equipment unit 111 or to a type of equipment unit 111. The equipment record 301 may be organized as a data structure in a memory. In the depicted embodiment, the equipment record 301 includes a unit identifier 337, an equipment status 331, the unit lock credential 333, and/or a plurality of user access records 335.

The unit identifier 337 may identify the equipment unit 111. In one embodiment, the unit identifier 337 identifies the type of equipment unit 111. For example, all MCC units may share a unit identifier 337.

The equipment status 331 may record a status of the equipment unit 111. The equipment status 331 may be one of energized and un-energized. In addition, the equipment status 331 maybe one of locked and unlocked.

The unit lock credential 333 may be employed to release the unit lock 125 that secures the equipment unit 111. In a certain embodiment, the unit lock credential 333 is communicated to the safety lock unit lock 125b, causing the actuator 141 to release the stop 139. In addition, the unit lock credential 333 may provide access to the electronic and/or physical key 133, allowing a user to release the padlock 137 of the manual unit lock 125a.

A user access record 335 may record each access of a user to the equipment unit 111. The user access record 335 may record the user credential, a username, and/or a timestamp.

FIG. 3C is a schematic block diagram of the user record 303. The user record 303 may be employed to manage the access of a user to a plurality of equipment units 111. The user record 303 may be organized as a data structure in a memory. In the depicted embodiment, the user record 303 includes the user credential 351 and equipment authorizations 353.

The user credential 351 maybe an alphanumeric string. The alphanumeric string may be encoded on and transmitted by the RFID 135. The alphanumeric string user credential 351 may be captured by the system 100 when the RFID 135 is read by a tag reader.

In one embodiment, the user credential 351 comprises a username and a password. The user credential 351 may be captured by the system 100 when entered into the engineering workstation 105 and/or the PLC 131. In addition, the user credential 351 may include a biometric for the user. For example, the user credential 351 may include a fingerprint, a voiceprint, and/or retinal scan.

The equipment authorizations 353 are described in FIG. 3D. the equipment authorizations 353 may be in a standard format.

FIG. 3D is a schematic block diagram of the equipment authorizations 353. In the depicted embodiment, the equipment authorizations 353 include entries for a plurality of equipment units 111. The entry for each equipment unit 111 is indexed by the unit identifier 337.

The user authorization 355 for each unit identifier 337 indicates whether the user and/or a category of user may access the corresponding equipment unit 111 and/or type of equipment unit 111. For example, the user authorization 355 may indicate that the user may access the equipment unit 111 or not access the equipment unit 111. In addition, the user authorization 355 may indicate the circumstances under which the user may access the corresponding equipment unit 111. For example, the user may be authorized to access the equipment unit 111 when the equipment unit 111 is energized. Alternatively, the user may be authorized to access the equipment unit 111 only when the equipment unit 111 is not energized.

In one embodiment, each entry includes the unit lock credential 333 for the corresponding equipment unit 111. The unit lock credential 333 may be unique to the user. Alternatively, the unit lock credential 333 may be common to all users and/or categories of users.

Figure 4A:
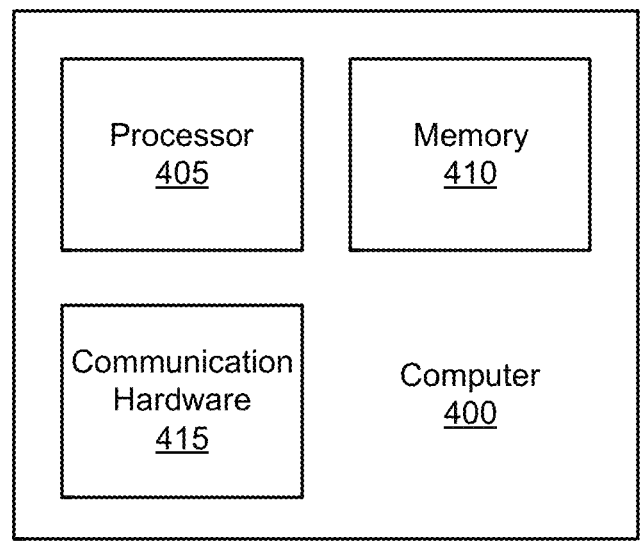
FIG. 4A is a schematic block diagram of a computer according to an embodiment.

FIG. 4A is a schematic block diagram of a computer 400. The computer 400 may be embodied in an engineering workstation 105, the PLC 131, electronic device 136, lock controller 112, and/or the server 117. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices and/or communication channels such as the network 115 and/or the secure conduit 103.

Figure 4B:
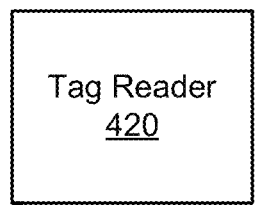
FIG. 4B is a schematic block diagram of a tag reader according to an embodiment.

FIG. 4B is a schematic block diagram of the tag reader 420. The tag reader 420 may be disposed on an equipment unit 111, a section 109, an access-controlled room 107, an engineering workstation 105, a PLC 131, and/or a server 117. The tag reader 420 may capture the user credential 351 from an RFID 135. The user credential 351 may be captured to authenticate the user. The tag reader 420 may receive the RFID 135 comprising the user credential 351 to authenticate the user and/or to determine whether the user is authorized to access the equipment unit 111 as will be described hereafter.

Figure 5A:
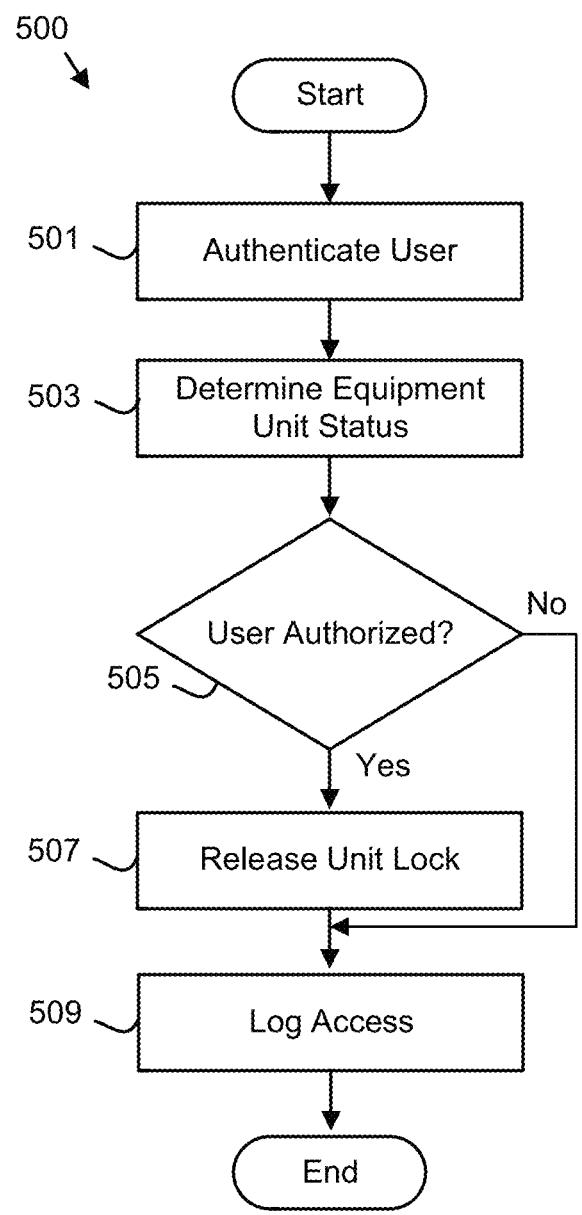
FIG. 5A is a schematic flow chart diagram of a secure access method according to an embodiment.

FIG. 5A is a schematic flow chart diagram of a secure access method 500. The method 500 may manage the access of the user to an equipment unit 111, a wire way 113, a section 109, and/or an access-controlled room 107. The method 500 may be performed by the system 100. In addition, the method 500 may be performed by the processor 405 of the computer 400.

The method 500 starts, and in one embodiment, the processor 405 authenticates 501 a user of an equipment unit 111. The user may be authenticated 501 with the user credential 351 for the user. The user may present an RFID 135 to a tag reader 420. The tag reader 420 may capture the user credential 351 from the RFID 135. The tag reader 420 may further communicate the user credential 351 to the engineering workstation 105, the PLC 131, and/or the server 117. The user may be authenticated 501 based on receipt of the user credential 351.

In one embodiment, the user is authenticated 501 from the engineering workstation 105. The user may be authenticated 501 by entering a username and password of the user credential 351 at the engineering workstation 105. The engineering workstation 105, the PLC 131, and/or the server 117 may receive the username and the password and authenticate 501 the user in response to authenticating the username and the password.

In a certain embodiment, the user is authenticated 501 by receiving a biometric for the user. For example, the tag reader 420, PLC 131, and/or the engineering workstation 105 may capture the biometric from the user and compare the captured biometric with the biometric of the user credential 351. The user may be authenticated 501 if the captured biometric and the biometric from the user credential 351 match.

The processor 405 may further determine 503 the equipment status 331. In one embodiment, the processor 405 queries the equipment unit 111 for the equipment status 331. In addition, the processor 405 may query the server 117 or the PLC 131 for the equipment status 331.

The processor 405 may determine 505 whether the user is authorized to access the equipment unit 111. In addition, the processor 405 may determine 505 whether the user is authorized and/or authenticated to access the equipment unit 111, wire way 113, and/or access-controlled room 107. The determination that the user is authorized may be based on the equipment status 331. In one embodiment, the processor 405 only determines whether the user is authorized and/or authenticated in response to authenticating 501 the user. The processor 405 may determine 505 the user is authorized to access the equipment unit 111 with the equipment authorization 353. In addition, the processor 405 may determine 505 whether the user is authorized to access the equipment unit 111 based on the user authorization 355. Table 1 illustrates one embodiment of determining whether the user is authorized to access the equipment unit 111, wire way 113, and/or access-controlled room 107.

TABLE 1

| User Authentication | Equipment Status 331 | User Authorization 355 | Authorized? |
---|---|---|---
| No | Unenergized | Unenergized Access | No |

TABLE 1-continued

| User Authentication | Equipment Status 331 | User Authorization 355 | Authorized? |
|---|---|---|---|
| No | Unenergized | Energized Access | No |
| No | Energized | Unenergized Access | No |
| No | Energized | Energized Access | No |
| Yes | Unenergized | Unenergized Access | Yes |
| Yes | Unenergized | Energized Access | Yes |
| Yes | Energized | Unenergized Access | No |
| Yes | Energized | Energized Access | Yes |

In one embodiment, specific equipment unit functions may require a specific equipment authorization 353. The equipment unit functions may include locking an equipment unit 111, unlocking a de-energized equipment unit 111, unlocking an energized equipment unit 111, locking a wire way 113, unlocking a wire way 113 with energized equipment units 111, and unlocking a wire way 113 with de-energized equipment units 111.

If the user is not authorized and/or authenticated, the processor 405 may log 509 the access attempt and the method 500 ends. If the user is authorized and authenticated to access the equipment unit 111, the processor 405 may release 507 the unit lock 125 for the equipment unit 111. The processor 405 may release 507 the unit lock 125 with the unit lock credential 333 and/or the user credential 351.

The processor 405 may communicate the unit lock credential 333 and/or the user credential 351 to the lock controller 112. The lock controller 112 may release 507 the unit lock 125 for the equipment unit 111.

The processor 405 may communicate the unit lock credential 333 and/or the user credential 351 to the electronic device 136 to release 507 the unit lock 125. In addition, the electronic device 136 may communicate the unit lock credential 333 and/or the user credential 351 to release 507 the unit lock 125. For example, an application executing on the electronic device 136 may communicate the unit lock credential 333 and/or the user credential 351 to the lock controller 112 to release the unit lock 125.

In one embodiment, the processor 405 provides and/or communicates the unit lock credential 333 and/or the user credential 351 to provide the user access to a key 133 for a padlock 137 on a manual unit lock 125a. In a certain embodiment, the key 133 is automatically provided in response to the unit lock credential 333 and/or the user credential 351. For example, the key 133 may be released from a lockbox.

In one embodiment, the processor 405 communicates the unit lock credential 333 and/or the user credential 351 to an administrator that provides the key 133. For example, the processor 405 may send an email with the unit lock credential 333, the user credential 351, and the unit identifier 337 to the administrator.

In one embodiment, the processor communicates the unit lock credential 333 to the safety lock unit lock 125b. The safety lock unit lock 125b may release the stop 139 in response to receiving the unit lock credential 333.

The unit lock credential 333 and/or the user credential 351 may provide access to the user to the equipment unit 111, the wire way 113, the section 109, and/or the access controls room 107. As a result, the user may access the equipment unit 111.

The processor 405 further logs 509 the access to the equipment unit 111 by the user in a user access record 335 and the method 500 ends. In one embodiment, the user credential 351, the equipment authorizations 353, the user authorization 355, the equipment status 331, and/or a timestamp are recorded to the user access record 335.

The method 500 provides identification and authentication control, preventing unintentional access to the equipment unit 111, the wire way 113, section 109, and/or the access controls room 107. In one embodiment, the method 500 identifies and authenticates all entities, including human users, software users, and electronic devices 136. The method 500 may protect against casual and/or coincidental access by unauthenticated entities. As a result, the safety of the system 100 is enhanced.

Figure 5B:
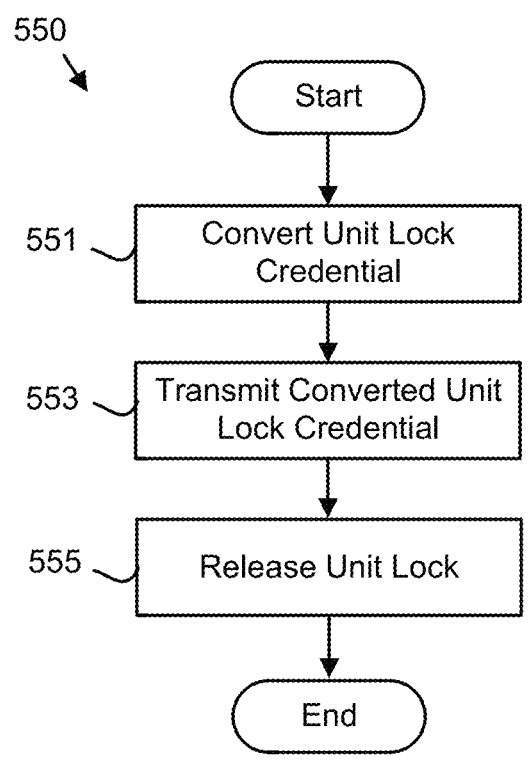
FIG. 5B is a schematic flow chart diagram of a unit lock release method according to an embodiment.

FIG. 5B is a schematic flow chart diagram of a unit lock release method 550. The method 550 releases the unit lock 125. In one embodiment, the method describes step 507 of FIG. 5A. The method 550 may be performed by the system 100. In addition, the method 550 may be performed by the processor 405 of the computer 400.

The method 550 starts, and in one embodiment, the processor 405 converts 551 the unit lock credential 333. The unit lock credential 333 may be converted 551 to a standard format. In one embodiment, the standard format is for transmission of the unit lock credential 333. The standard format may include encryption. In addition, the standard format may include a timestamp. In one embodiment, the standard format includes the user credential 351.

The processor 405 may further transmit 553 the converted unit lock credential 333. The converted unit lock credential 333 may be transmitted 553 to a unit lock 125 such as the safety lock unit lock 125b, to a door, to it administrator, and/or to a lockbox, and/or to a automation device inside the unit 111

The unit lock 125 may be released 555 in response to receiving the converted unit lock credential 333 and the method 550 ends. For example, the safety lock unit lock 125b may release 555 in response to receiving the converted unit lock credential 333. In one embodiment, the unit lock 125 is released 555 in response to wirelessly receiving the unit lock credential 333. The unit lock credential 333 may be communicated via a BLUETOOTH® communication or the like. The unit lock 125 may be released by providing the user access to the access-controlled room 107.

Figure 5C:
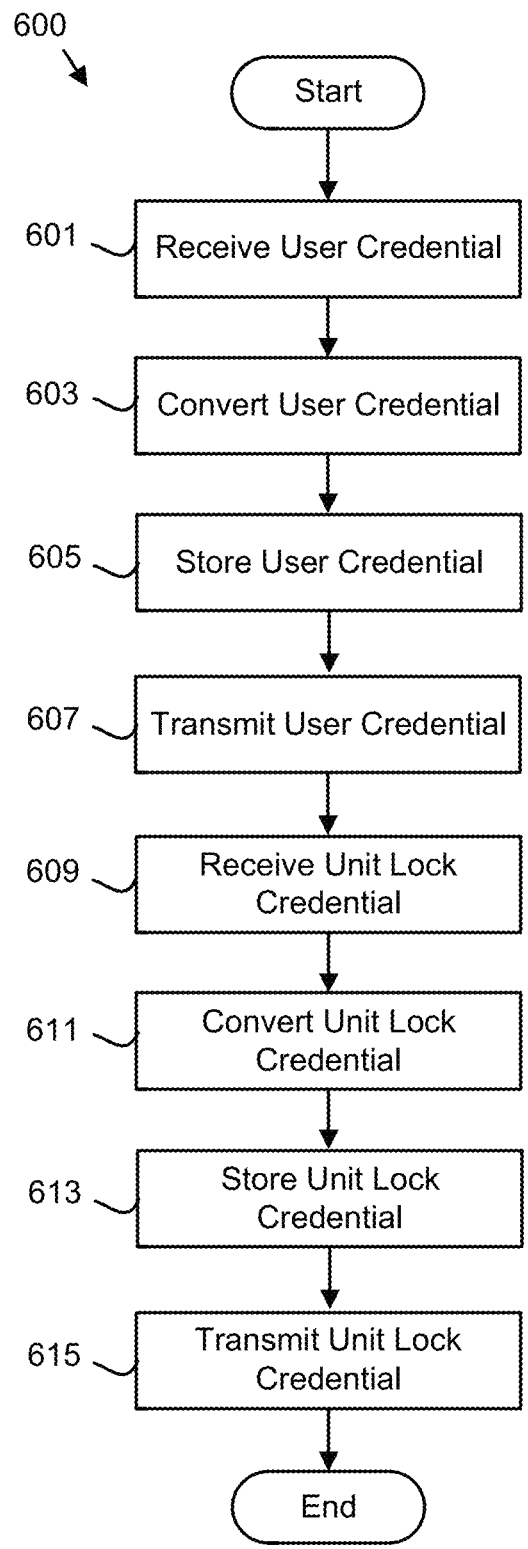
FIG. 5C is a schematic flow chart diagram of a data conversion method according to an embodiment.

FIG. 5C is a schematic flow chart diagram of a data conversion method 600. The method 600 may convert the user credential 351 and/or the unit lock credential 333. The method 600 may be performed by the system 100. In addition, the method 600 may be performed by the processor 405 of the computer 400.

The method 600 starts, and in one embodiment, the processor 405 receives 601 the user credential 351. The user may enter the user credential 351 at the engineering workstation 105 and/or PLC 131. In addition, the tag reader 420 may capture the user credential 351. For example, the tag reader 420 may read the user credential 351 from the RFID 135 and/or capture a biometric user credential 351 from the user.

The processor 405 may convert 603 the user credential 351 to a standard format. The standard format may include a timestamp. In addition, the standard format may include an encrypted verification value. The encrypted verification value may be used to verify the source of the user credential 351.

The processor 405 may further store 605 the user credential 351. For example, the user credential 351 may be stored in the memory 410. In one embodiment, the processor 405 transmits 607 the user credential 351. For example, the user credential 351 may be transmitted 607 to the server 117.

The processor 405 may receive the unit lock credential 333. In one embodiment, the unit lock credential 333 is received 609 from the server 117, the engineering workstation 105, and/or the PLC 131, in response to the user being authenticated and authorized to access the equipment unit 111. The processor 405 may convert the unit lock credential 333 to a standard format. The standard format may include a timestamp. In addition, the standard format may include an encrypted verification value. The encrypted verification value may be used to verify the source of the unit lock credential 333.

The processor 405 may store 613 the converted unit lock credential 333. The unit lock credential 333 may be stored in the memory 410. The processor 405 may further transmit 615 the unit lock credential 333 and the method 600 ends. For example, the processor 405 may transmit 615 the unit lock credential 333 to the unit lock 125.

The method 600 converts the user credential 351 and/or the unit lock credential 333 to a standard format that supports the authentication and authorization for the user to access the equipment unit 111. As a result, the efficiency and effectiveness of the computer 400 and/or process 405 in providing secure and safe access control to the equipment units 111 is improved.

Problem/Solution

Equipment units 111 may manage high electrical currents and/or control automation equipment. If an untrained user accessed the equipment unit 111, the user could harm himself and/or cause damage to the automation equipment. As a result, only authenticated and authorized users should have access to the equipment unit 111.

The embodiments authenticate a potential user of the equipment unit 111 prior to access by the user. The user may be authenticated with the user credential 351 for the user. As a result, the user is known to the embodiments. The embodiments further determine whether the user is authorized to access the equipment unit 111 with the equipment authorization 353. By employing both the user credential 351 and the equipment authorization 353, the security and safety of access to the equipment unit 111 is increased as a user must be both authenticated and authorized.

In response to the user being authenticated and authorized, the embodiments release the unit lock 125 for the equipment unit 111 with the unit lock credential 333 or the user credential 351. Thus, the equipment unit 111 is efficiently and effectively secured from unauthorized access.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   authenticating, by use of a processor, a user of an equipment unit with a user credential;
   determining an equipment status for the equipment unit, the equipment status comprising one of energized and un-energized and one of locked and unlocked;
   determining whether the user is authorized to access the equipment unit with an equipment authorization, wherein the determination that the user is authorized is based on the equipment status; and
   in response to the user being authenticated and authorized to access the equipment unit, releasing a unit lock for the equipment unit with a unit lock credential or the user credential.

2. The method of claim 1, wherein the unit lock comprises a padlock that locks equipment unit and the unit lock is released by providing a unit lock credential that releases a key to the user.

3. The method of claim 1, wherein a tag reader receives a radio frequency identifier (RFID) comprising the user credential to determine whether the user is authorized to access the equipment unit and the unit lock is released by providing a unit lock credential to the unit lock.

4. The method of claim 1, wherein the unit lock secures a wireway door and an expansion plate blocks an equipment unit door from opening, wherein the unit lock is released from the wireway door to release the expansion plate and release the equipment unit door.

5. The method of claim 1, wherein the unit lock is released in response to wirelessly receiving the unit lock credential.

6. The method of claim 1, wherein the user is authenticated from an engineering workstation that is in communication with the equipment unit via a secure conduit that provides communication security.

7. The method of claim 1, wherein the user is authenticated from a programmable logic controller that is in communication with the equipment unit via a secure conduit that provides communication security.

8. The method of claim 1, wherein the equipment unit is disposed in an access-controlled room and the unit lock is released by providing the user access to the access-controlled room.

9. The method of claim 1, the method further comprising logging the user access in a user access record.

10. The method of claim 1, wherein the user credential is in a standardized format, the equipment authorization is in a standard format, and the unit lock credential is in a standardized format.

11. An apparatus comprising:
    a processor;
    a memory storing code executable by the processor to:
    authenticate a user of an equipment unit with a user credential;
    determine an equipment status for the equipment unit, the equipment status comprising one of energized and un-energized and one of locked and unlocked;
    determine whether the user is authorized to access the equipment unit with an equipment authorization, wherein the determination that the user is authorized is based on the equipment status; and
    in response to the user being authenticated and authorized to access the equipment unit, release a unit lock for the equipment unit with a unit lock credential or the user credential.

12. The apparatus of claim 11, wherein the unit lock comprises a padlock that locks equipment unit and the unit lock is released by providing a unit lock credential that releases a key to the user.

13. The apparatus of claim 11, wherein a tag reader receives a radio frequency identifier (RFID) comprising the user credential to determine whether the user is authorized to access the equipment unit and the unit lock is released by providing a unit lock credential to the unit lock.

14. The apparatus of claim 11, wherein the unit lock secures a wireway door and an expansion plate blocks an equipment unit door from opening, wherein the unit lock is released from the wireway door to release the expansion plate and release the equipment unit door.

15. A computer program product, the computer program product comprising a non-transitory computer readable storage medium having program code embodied therein, the program code readable/executable by a processor to:

authenticate a user of an equipment unit with a user credential;

determine an equipment status for the equipment unit, the equipment status comprising one of energized and un-energized and one of locked and unlocked;

determine whether the user is authorized to access the equipment unit with an equipment authorization, wherein the determination that the user is authorized is based on the equipment status; and in response to the user being authenticated and authorized to access the equipment unit, release a unit lock for the equipment unit with a unit lock credential or the user credential.

16. The computer program product of claim 15, wherein the unit lock comprises a padlock that locks equipment unit and the unit lock is released by providing a unit lock credential that releases a key to the user.

17. The computer program product of claim 15, wherein a tag reader receives a radio frequency identifier (RFID) comprising the user credential to determine whether the user is authorized to access the equipment unit and the unit lock is released by providing a unit lock credential to the unit lock.

* * * * *